US009145948B2

(12) United States Patent
Corio

(10) Patent No.: US 9,145,948 B2
(45) Date of Patent: Sep. 29, 2015

(54) AIRCRAFT TIE-DOWN DEVICE

(71) Applicant: Salvatore Corio, Warwick, RI (US)

(72) Inventor: Salvatore Corio, Warwick, RI (US)

( * ) Notice: Subject to any disclaimer, the term of this patent is extended or adjusted under 35 U.S.C. 154(b) by 0 days.

(21) Appl. No.: 14/050,057

(22) Filed: Oct. 9, 2013

(65) Prior Publication Data

US 2015/0096151 A1    Apr. 9, 2015

(51) Int. Cl.
*B64D 9/00* (2006.01)
*F16G 11/14* (2006.01)
*B64F 1/12* (2006.01)

(52) U.S. Cl.
CPC .. *F16G 11/14* (2013.01); *B64F 1/12* (2013.01)

(58) Field of Classification Search
CPC ......... F16G 11/14; F16G 11/12; F16G 11/00; F16G 9/00; F16G 11/10; B60P 7/0823; B64F 1/12; B64F 1/16; A47C 3/0255; A47G 2007/003; A47G 7/047; B60R 9/048; B62J 7/08
USPC .......................... 24/115 H, 129 R, 130, 136 R
See application file for complete search history.

(56) References Cited

U.S. PATENT DOCUMENTS

| 402,130 | A | * | 4/1889 | Bedford | 297/273 |
|---|---|---|---|---|---|
| 1,422,804 | A | * | 7/1922 | Witte | 24/129 R |
| 2,561,371 | A | * | 7/1951 | Hill | 24/129 R |
| 4,120,077 | A | * | 10/1978 | Fink | 24/130 |
| 4,220,306 | A | * | 9/1980 | Cueto et al. | 248/328 |
| 5,020,192 | A | * | 6/1991 | Gerlach | 24/136 R |
| 5,351,367 | A | * | 10/1994 | Kennedy et al. | 24/129 R |
| 6,389,655 | B2 | * | 5/2002 | Libecco | 24/300 |
| 6,477,748 | B2 | * | 11/2002 | Steiner | 24/130 |
| 6,675,447 | B1 | * | 1/2004 | Hofeldt | 24/129 R |
| 2002/0032953 | A1 | * | 3/2002 | Maurer | 24/136 R |

* cited by examiner

*Primary Examiner* — Robert J Sandy
*Assistant Examiner* — David Upchurch
(74) *Attorney, Agent, or Firm* — Kelly K. Burris

(57) ABSTRACT

A tie-down device, for use in aircraft by way of example, is provided that includes an elongated member having an upper surface portion, a lower surface portion, a first end portion and a second end portion opposite the first end portion. Each end portion has an aperture extending transversely through the upper and lower surface portions. A pliable cord extends through the apertures and has a grounding end portion and a stop end portion. A distal securing member, such as a hook, is fixed to the grounding end portion of the pliable cord, and a proximal securing member, also a hook by way of example, is slidably engaged along the pliable cord. The grounding end portion is secured to a ground member, the proximal securing member is secured to the aircraft, and the elongated member is slid distally towards the grounding end portion to tighten the device.

8 Claims, 5 Drawing Sheets

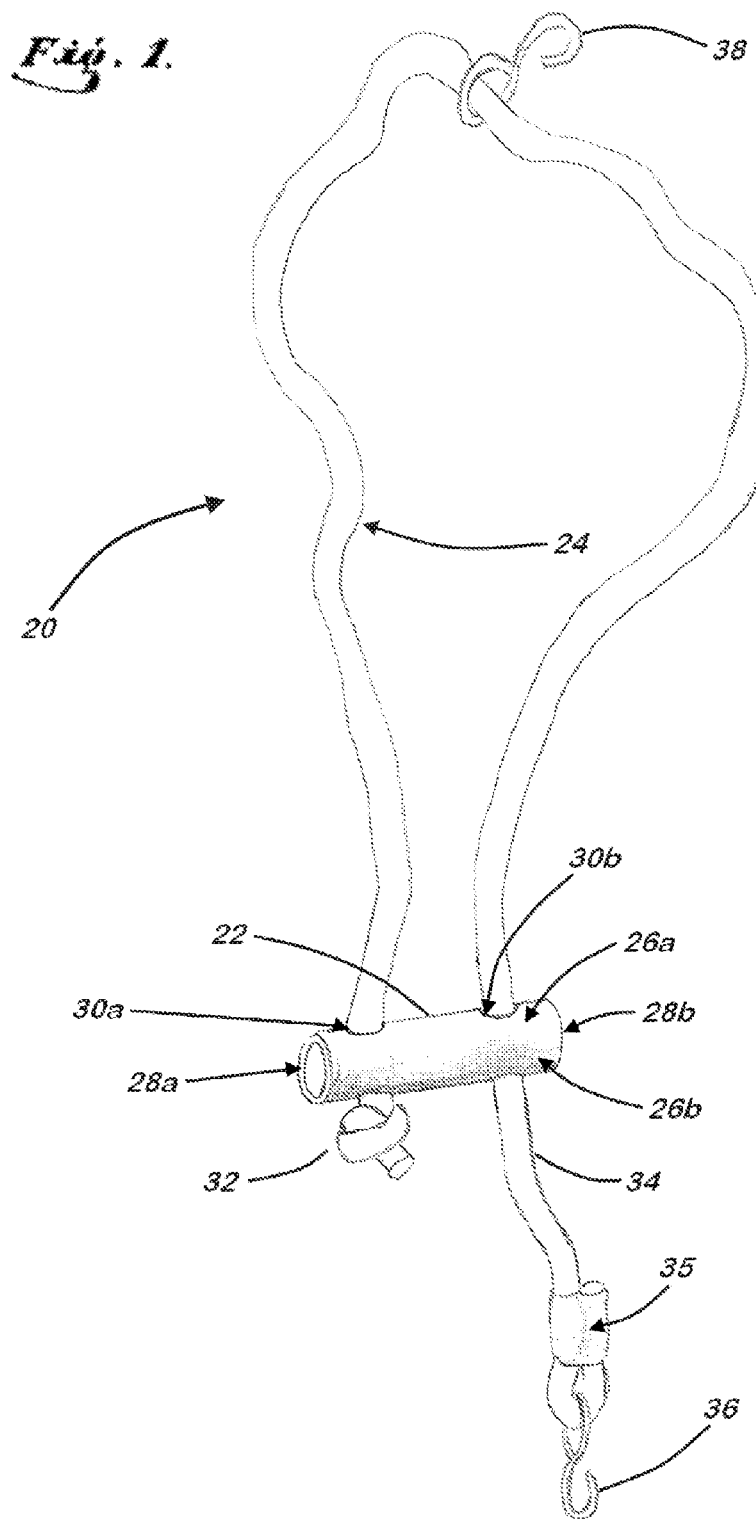

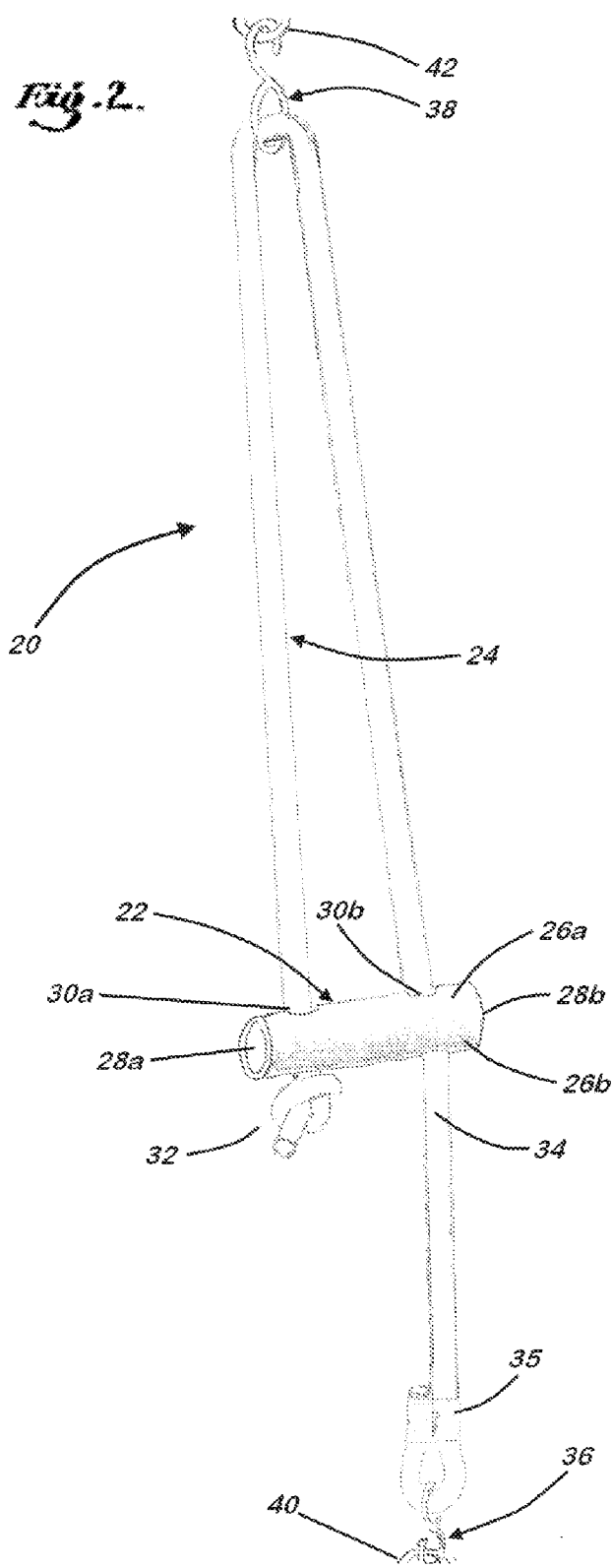

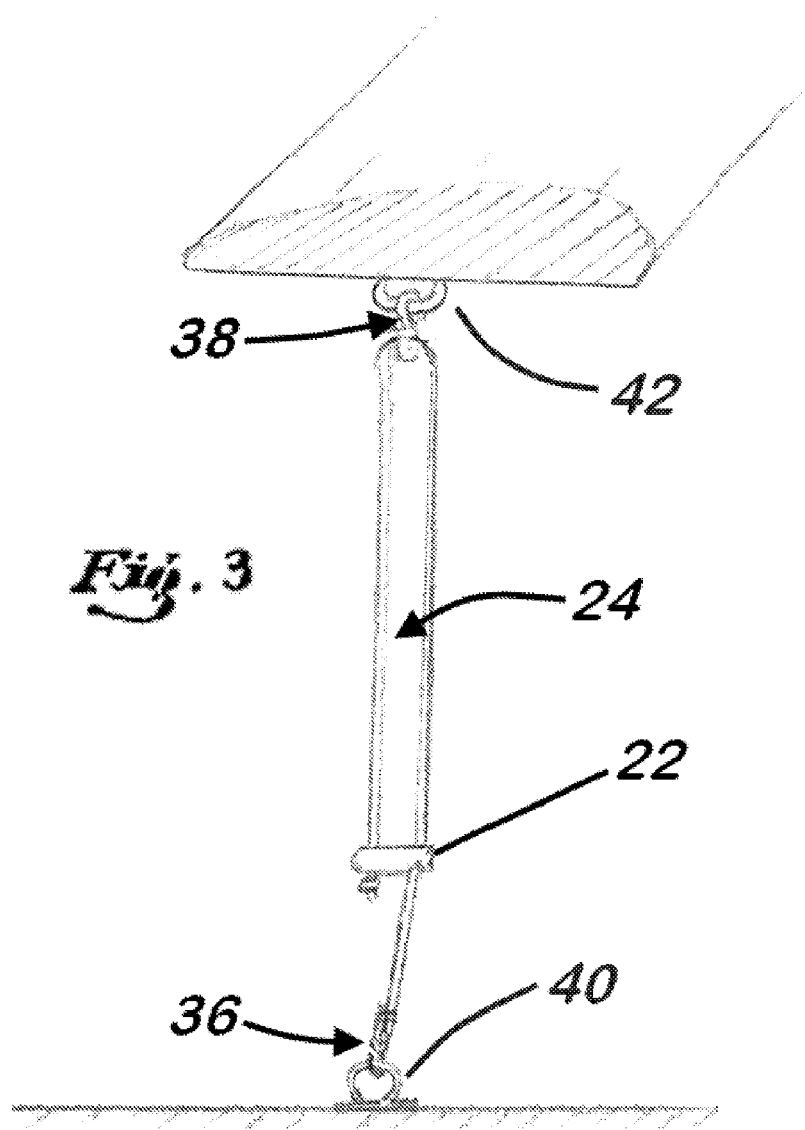

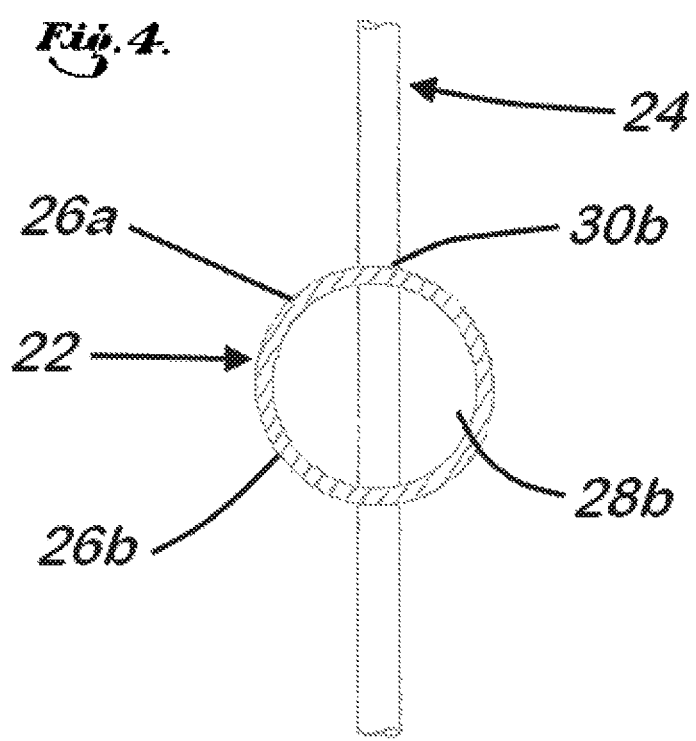

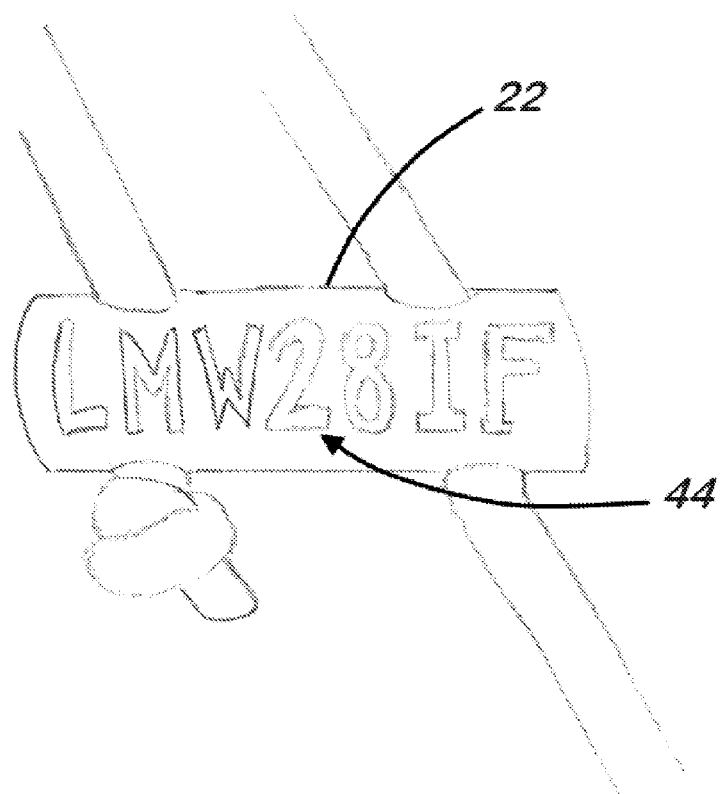

AIRCRAFT TIE-DOWN DEVICE

FIELD

The present disclosure relates to tie-down devices and more specifically to tie-down devices for securing aircraft.

BACKGROUND

The statements in this section merely provide background information related to the present disclosure and may not constitute prior art.

Securing devices for aircraft come in a variety of types. One such type is sliding cord lock devices such as those disclosed in U.S. Pat. No. 234,896; U.S. Pat. No. 1,422,804; U.S. Pat. No. 2,561,371; U.S. Pat. No. 4,220,306; and U.S. Pat. No. 6,477,748.

Many of the known securing or tie-down devices are relatively complicated, expensive, and often do not properly secure the object sufficiently, for example, during dangerous weather conditions.

SUMMARY

In one form of the present disclosure, an aircraft tie-down device is provided that comprises an elongated member having upper and lower surface portions, first and second opposite end portions, and apertures extending transversely through the upper and lower surface portions. The aircraft tie-down has a pliable cord extending through both of these apertures, the pliable cord having a grounding end portion and a stop end portion, where the stop end portion could be secured by a knot. The tie-down has a distal securing member fixed to the grounding end of the cord, and a proximal securing member slidably engaged along the cord between the apertures through the upper portion of the elongated member. When the device is engaged, the ground end portion of the cord is secured to a ground member, the proximal securing member is secured to an aircraft, and the elongated member is slid downward to tighten the device.

The pliable cord described in this disclosure may be any length or diameter of braided nylon rope, a Kernmantle rope, an organic fiber rope, elastomeric bungee cord, or a chain, by way of example. In one form, the pliable cord is a nylon rope.

The securing members described in this disclosure may be clasps, clamps, or rigid hooks, by way of example. In one form, the securing members are rigid hooks having an elastomeric coating.

The elongated member described in this disclosure may be a hollow cylinder shape or a hollow object of polygonal cross-section (e.g. triangular, cuboid, hexagonal, etc.). In one form, the hollow cylindrical elongated member is an aluminum or steel material having a powder coating. It should be understood, however, that other materials such as plastic (thermoset or thermoplastic, neet or fiber-reinforced) may also be employed while remaining within the scope of the present disclosure. It should also be understood that the elongated member need not be hollow and could be a solid member or having an alternate material filling such as foam in order to more securely In one form of the present disclosure, the grounding end portion of the rope describes a loop of desired size secured by a sleeve.

In another form of the present disclosure, the pliable cord defines a camouflage pattern.

In still another form of the present disclosure, the elongated member comprises markings on a side surface portion customized to the aircraft (e.g. aircraft registration or "N" number, corporate logos/brands, color schemes, glow-in-the-dark marking, or other personalization, among others).

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 1 is a perspective view of the aircraft tie-down device, constructed in accordance with the teachings of the present disclosure;

FIG. 2 is a perspective view of the aircraft tie-down device when engaged;

FIG. 3 is a depiction of one possible use of the aircraft tie-down device;

FIG. 4 is a side view of one possible embodiment of the elongated member with a pliable cord passing through the apertures therein; and FIG. 5 is a front view of the elongated member having markings on a side surface portion customized to the aircraft.

DETAILED DESCRIPTION

The following description is merely exemplary in nature and is not intended to limit the present disclosure, application, or uses. It should be understood that throughout the drawings, corresponding reference numerals indicate like or corresponding parts and features. It should also be understood that various cross-hatching patterns used in the drawings are not intended to limit the specific materials that may be employed with the present disclosure. The cross-hatching patterns are merely exemplary of preferable materials or are used to distinguish between adjacent or mating components illustrated within the drawings for purposes of clarity.

Referring to FIG. 1 and FIG. 2, one form of the aircraft tie-down device is given generally indicated by reference numeral 20. The aircraft tie-down device includes a single piece of pliable cord is shown by element 24. The aircraft tie-down 20 further comprises an elongated member 22 that has an upper surface portion 26a and a lower surface portion 26b, and a first end portion 28a opposite a second end portion 28b. The first end portion has an aperture 30a extending transversely through the upper and lower surface portions, 26a and 26b, and the second end portion 28b has an aperture 30b extending transversely through the upper and lower surface portions 26a and 26b.

The pliable cord 24 defines an outer dimension, e.g., outer diameter, that is substantially the same as the opening size of the apertures 30a and 30b. As such, there exists a friction fit between the pliable cord 24 and the elongated member 22, such that when the pliable cord 24 is slid through the elongated member 22, an appreciable amount of friction occurs therebetween, as set forth in greater detail below. The pliable cord 24 extends through the apertures 30a and 30b as shown and has a stop end portion 32, secured with a knot in this embodiment, and a grounding end portion 34. The grounding end portion 34 forms a loop secured by a sleeve 35, which his an elastomeric crimp in this form of the present disclosure.

A distal securing member 36 is fixed to the grounding end portion 34 of the pliable cord 24. A proximal securing member 38 is slidably engaged along the pliable cord between the apertures 30*a* and 30*b* extending through the upper surface portion 26*a* of the elongated member 22. In this form, the securing members are rigid hooks having an elastomeric coating, however, it should be understood that other devices may be employed while remaining within the scope of the present disclosure.

Referring to FIG. 2 and FIG. 3, the tie-down device 20 is depicted engaged, with the distal securing member 36 secured to a ground member 40 and the proximal securing member 38 secured to an aircraft 42.

More specifically, to engage or tighten the device 20, the distal securing member 36 is secured to a ground member 40 and the proximal securing member 38 is secured to an aircraft 42. The elongated member 22 is then drawn distally towards the grounding end portion 34 of the pliable cord 24. As the elongated member 22 is slid distally, the pliable cord 24 slides through the aperture 30*b*, while the stop end portion 32 remains fixed, thereby tightening the pliable cord 24 as shown.

Referring to FIG. 4, a side view of the elongated member 22 is shown, looking upon second end portion 28*b*, with the pliable cord 24 passing through the aperture 30*b* in the upper surface portion 26*a* and lower surface portion 26*b* of the elongated member 22.

Referring to FIG. 5, a close-up front view of the elongated member 22 is depicted having markings 44 customize to the aircraft. These markings 44 can be any form, including graphical patterns, and thus the example illustrated herein should not be construed as limiting the scope of the present disclosure.

The description of the disclosure is merely exemplary in nature and, thus, variations that do not depart from the substance of the disclosure are intended to be within the scope of the disclosure. For example, although the tie-down device is shown for use in aircraft, it should be understood that any object may be secured using the tie-down device according to the teachings of the present disclosure. For example, securing a motor vehicle to a trailer, an awning to the ground, or a kayak/canoe/paddleboard to the roof of a vehicle, among others. Such variations are not to be regarded as a departure from the spirit and scope of the disclosure.

What is claimed is:

1. An aircraft tie-down device comprising consisting of:
   a hollow elongated member having a smooth upper surface portion, a smooth lower surface portion, a first end portion and a second end portion opposite the first end portion, each end portion having an aperture extending transversely through the upper and lower surface portions;
   a pliable cord extending through the apertures of the first and second end portions of the hollow elongated member, the pliable cord having a grounding end portion and a stop end portion;
   a distal securing member fixed to the grounding end portion of the pliable cord; and
   a proximal securing member slidably engaged along the pliable cord between the apertures extending through the upper surface portion of the hollow elongated member,
   wherein the grounding end portion is secured to a ground member, the proximal securing member is secured to the aircraft, and the elongated member is slid distally towards the grounding end portion to tighten the device.

2. The aircraft tie-down device of claim 1 wherein the hollow elongated member is of a generally cylindrical shape.

3. The aircraft tie-down device of claim 1 wherein the hollow elongated member has a polygonal cross-sectional shape.

4. The aircraft tie-down device of claim 1 wherein the stop end portion defines a knot.

5. The aircraft tie-down device of claim 1 wherein the proximal and distal securing members are rigid hooks.

6. The aircraft tie-down device of claim 1 wherein grounding end portion of the pliable cord defines a loop secured by a sleeve.

7. The aircraft tie-down device of claim 1 wherein the pliable cord defines a camouflage pattern.

8. The aircraft tie-down device of claim 1 wherein the elongated member comprises markings on a side surface portion customized to identify the aircraft.

\* \* \* \* \*